United States Patent [19]

Ernst et al.

[11] Patent Number: 5,125,941

[45] Date of Patent: Jun. 30, 1992

[54] AIR INTAKE FILTER FOR INTERNAL COMBUSTION ENGINES

[75] Inventors: Volker Ernst, Sachsenheim; Herbert Hack, Remseck; Guenther Scholz, Stuttgart, all of Fed. Rep. of Germany

[73] Assignee: Filterwerk Mann & Hummel GmbH, Ludwigsburg, Fed. Rep. of Germany

[21] Appl. No.: 768,047

[22] Filed: Oct. 1, 1991

[30] Foreign Application Priority Data

Oct. 1, 1990 [DE] Fed. Rep. of Germany ...... 4031014

[51] Int. Cl.⁵ .............................................. B01D 46/00
[52] U.S. Cl. ...................................... 55/480; 55/481;
55/493; 55/502; 55/504; 55/521; 55/DIG. 31
[58] Field of Search ............... 55/480, 481, 493, 497,
55/502, 504, 507, 521, DIG. 31

[56] References Cited

U.S. PATENT DOCUMENTS

| | | | |
|---|---|---|---|
| 3,397,518 | 8/1968 | Rogers | 55/497 |
| 3,793,813 | 2/1974 | McAllister | 55/481 |
| 4,018,580 | 4/1977 | Burkholz et al. | 55/481 X |
| 4,236,901 | 12/1980 | Kato et al. | 55/497 X |
| 4,488,948 | 12/1984 | Doyle | 55/481 |
| 4,925,469 | 5/1990 | Clement et al. | 55/480 |
| 5,030,264 | 7/1991 | Klotz et al. | 55/481 |

FOREIGN PATENT DOCUMENTS 70636 1/1983 European Pat. Off.
391019 10/1990 European Pat. Off.
2512724 12/1976 Fed. Rep. of Germany.

Primary Examiner—Charles Hart
Attorney, Agent, or Firm—Foley & Lardner

[57] ABSTRACT

An air intake filter for internal combustion engines has a flat, replaceable filter insert 20, through which the air flows transversely in operation, and which has a gasket 22 disposed on the periphery for sealing at the face side against a ledge 15 of the filter housing 11. The insert can be inserted into the filter housing through a narrow side, the sealing pressure being produced by a cover 50 which has two sliding wedges 51 and 53. To bring it about that, when the sealing pressure is applied, the gasket 22 will not be shifted laterally with respect to the ledge 15 of the filter housing 11, the cover, which is in the form of a substantially open frame, replaceably accommodates the filter insert. The cover is provided with cams 40 and 41 which serve to fix the frame 30 in an extended position during the replacement of the filter insert. Also the lateral walls 25 and 26 of the filter housing and the lateral walls 45 and 46 of the frame 30 are inclined wedgewise to avoid large frictional forces between the adjacent surfaces when the filter is installed and removed.

7 Claims, 3 Drawing Sheets

AIR INTAKE FILTER FOR INTERNAL COMBUSTION ENGINES

BACKGROUND OF THE INVENTION

This invention relates to an air intake filter for internal combustion engines comprising a housing and a flat, replaceable filter insert through which air passes transversely in operation, wherein the filter insert is insertable into the filter housing through a narrow side and has a gasket disposed circumferentially on an end face for sealingly engaging a ledge of the filter housing.

German published Patent Application DE 39 11 153 discloses an air intake filter of this type for internal combustion engines. This filter has proven effective in practice, but there is a danger that, when the filter insert is replaced, some of the steps of the procedure may not always be performed correctly and therefore, under certain circumstances, the filter insert may be improperly installed. Thus, there remains a need for improved air intake filter designs.

SUMMARY OF THE INVENTION

It is the object of the present invention to provide an air intake filter for an internal combustion engine which is designed to assure problem-free replacement at any time.

This and other objects of the invention are achieved by providing an air intake filter for an internal combustion engine, the filter comprising a housing having a filter insertion opening at one side thereof; a flat, replaceable filter insert through which air passes transversely in operation, the filter insert being insertable into the filter housing through the filter insertion opening and having a gasket disposed circumferentially on an end face for sealingly engaging a ledge of the filter housing, the housing having inclined shoulders on lateral parts thereof for pressing the filter insert with the gasket against the ledge; a frame having a substantially open end face for replaceably receiving the filter insert, and a cover which can be pushed in the direction of insertion of the filter insert from an extended position to a lockable closed position, the cover having abutments resting against the inclined ledges of the lateral parts of the filter housing and against the frame for sealingly pressing the filter insert with the gasket against the ledge, and the cover further having two sliding wedges which laterally embrace the frame and are fixedly joined to one another by a face plate, and catch means provided on the sliding wedges for engaging the frame and holding the frame in the extended position with respect to the cover.

An important advantage of the invention is that, when the cover is pulled out, the frame snaps onto the cover in an extended end position. Thus the frame is fixed initially in a specific position on the cover, and the filter insert can then be replaced. When the frame and the cover are reintroduced into the filter housing, it is thereby assured that the frame—since it is held in its extended end position by the catches—will first be brought into its correct position inside the filter housing, and then the catches holding the frame in the extended position will be overcome and the cover pushed into the filter housing.

The frame with the filter insert and the gasket is not pressed against the ledge on the filter housing until the cover is pushed in.

In a preferred embodiment the catches are cams provided on the sliding wedges, and there are no recesses on the frame opposite the catches. Instead, the corners of the frame form the counterpart against which the cams act.

It has been found in practice that dust accumulates especially on the surfaces between frame and cover that slide on one another, and this inhibits the sliding action of these surfaces.

According to a further development of the invention all surfaces which slide on one another are provided with bosses or linear ridges, so that any dust that might collect on them will deposit itself between these elevations and will not significantly impede the sliding of the surfaces on one another.

In an additional advantageous configuration of the invention, alternative to the arrangement of bosses or linear ridges, the surfaces that slide on one another are constructed in wedge-like form. When the cover is removed, the wedge-like configuration of one or more surfaces causes a space to open up between the sliding surfaces so that dust and dirt can fall away and not interfere with the function of the parts that slide on one another.

BRIEF DESCRIPTION OF THE DRAWINGS

The invention will be explained in further detail below with reference to an illustrative preferred embodiment shown in the accompanying drawings in which.

DETAILED DESCRIPTION OF PREFERRED EMBODIMENTS

Figure 1:
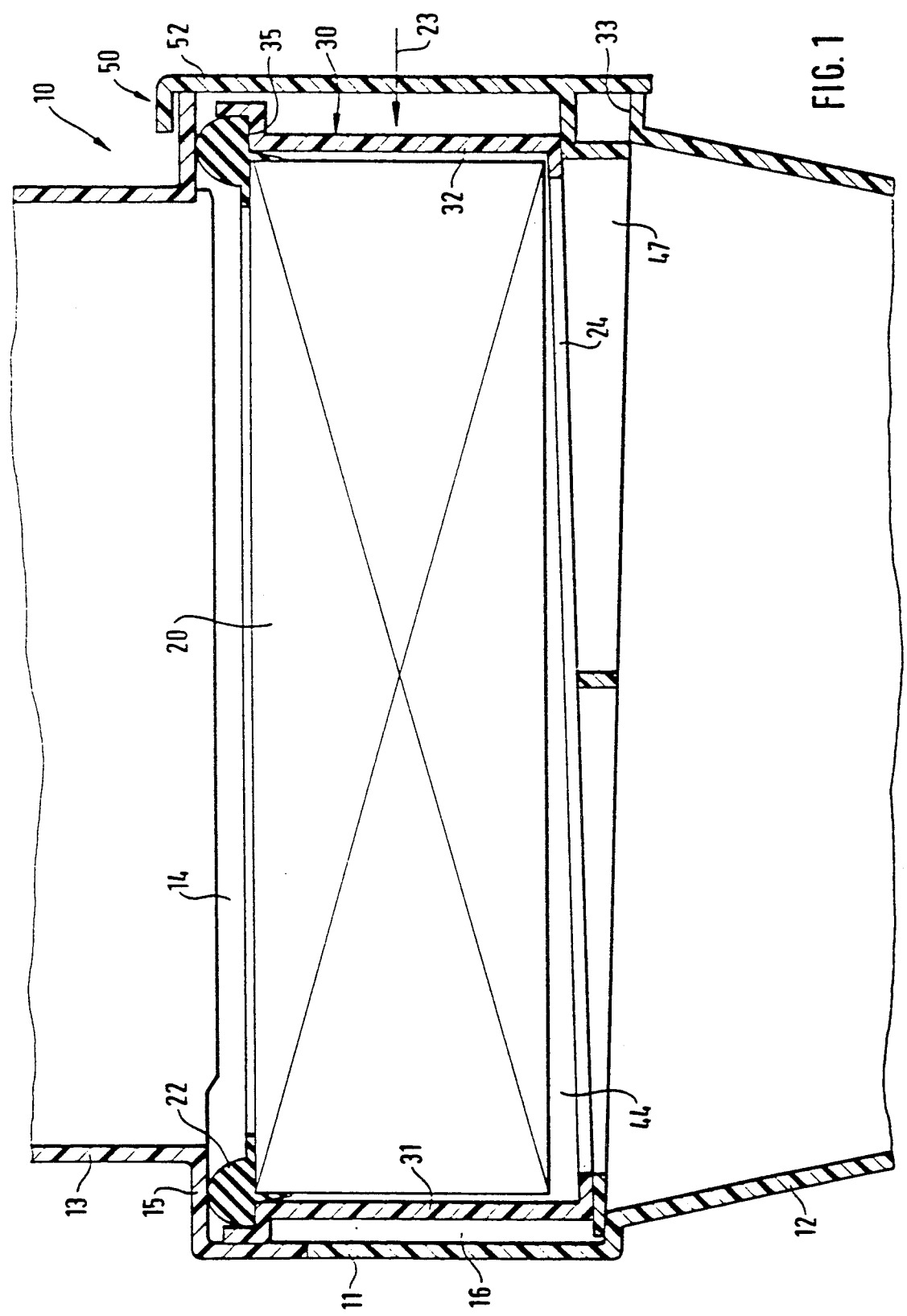
FIG. 1 is a sectional view through an air intake filter showing a filter insert urged sealingly in the closed position.

FIG. 1 shows an air intake filter 10 comprising a filter housing 11 of plastic, into which a duct 12 for the aspiration of the contaminated air leads from below, and from which a clean air duct 13 leads upward.

A rectangular filter insert 20, which includes a pleated filter paper in known manner, is provided with a gasket 22 around the circumference of one end face. Gasket 22 preferably has an average Shore hardness of 8 to 16. In the filter housing 11 the filter insert 20 separates a clean air chamber 14 from a raw air chamber 44. The filter insert 20 is replaceably inserted in a frame 30 which is substantially open at the front end, and which is also made of plastic. The sides 31 and 32 of frame 30 have a ledge 35 disposed at a uniform height, against which gasket 22 of filter insert 20 is placed.

Figure 2:
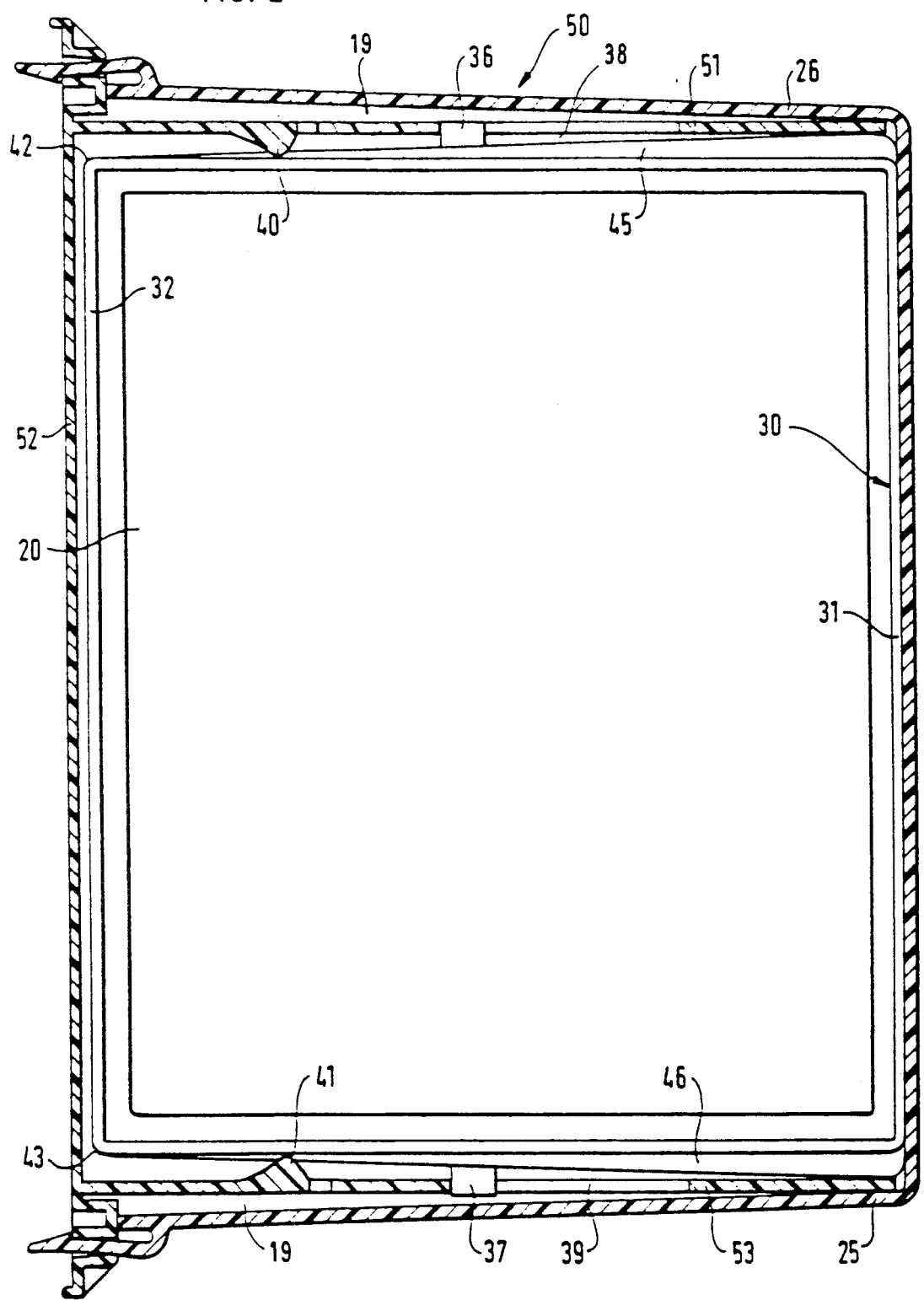
FIG. 2 is a sectional top plan view of the air intake filter of FIG. 1.

The frame 30 is carried within a cover 50, which consists of a face plate 52 on which, as shown in FIG. 2, two lateral wings in the form of sliding wedges 51 and 53 are provided. This cover 50 is inserted with the frame 30 in the direction of the arrow 23 into the opening 16 of filter housing 11. Sliding wedges 51 and 53 are provided with lower wedge portions 47 which slide on inclined ledges 19 on the lateral parts 25 and 26 of housing 11. Due to the configuration of wedge portions 47 the sliding wedges 51 and 53, the frame 30 with the filter insert 20 situated therein will be displaced toward the clean air chamber 14 when the cover 50 is inserted, and thus a sealing off of the clean air chamber by means of the ledge 15 and the gasket 22 will be achieved.

When the filter insert is to be removed from the filter housing, first the cover 50 is moved opposite to the direction of the arrow 23. The result is that the locking force which was pressing the filter insert 20 against the ledge 15 is removed. Initially, the filter insert 20 with frame 30 will remain in its installed position, but as soon as the two laterally extending catches 36 and 37 formed on the frame 30 reach the ends of elongated holes 38 and 39 formed in the sliding wedges 51 and 53, the frame 30 will also be pulled along by the cover 50. At the same time, cams 40 and 41, which are formed on the sliding wedges, will catch on the front corners 42 and 43 of the frame 30 and thus hold the frame 30 in this extended position.

After a new filter insert 20 is inserted into the frame 30, the frame can be pushed back into the filter housing 11. The cams 40 and 41 assure that the cover 50 will not be able to close and seal off the frame 30 until the frame has been inserted all the way into the housing and abuts against the end of the housing. Not until this condition is fulfilled is the holding force of the cams 40 and 41 overcome and the cover 50 is pushed all the way into the filter housing 11.

As shown in FIG. 2, both the two lateral walls 25 and 26 of the filter housing 11 and the lateral walls 45 and 46 of frame 30 are wedge-shaped. As a result of this double wedge-shaped configuration, the adjacent surfaces of the filter housing and the frame do not slide on one another when the cover 50 is removed, so that a large releasing force is not required, particularly when these surfaces are contaminated with dust or dirt.

In like manner, both the bottom 24 of frame 30 and the bottom 33 of the filter housing 11 are wedge-shaped, as shown in FIG. 1, so that these surfaces in contact with the sliding wedge portions 47 also require no great releasing force.

Figure 3:
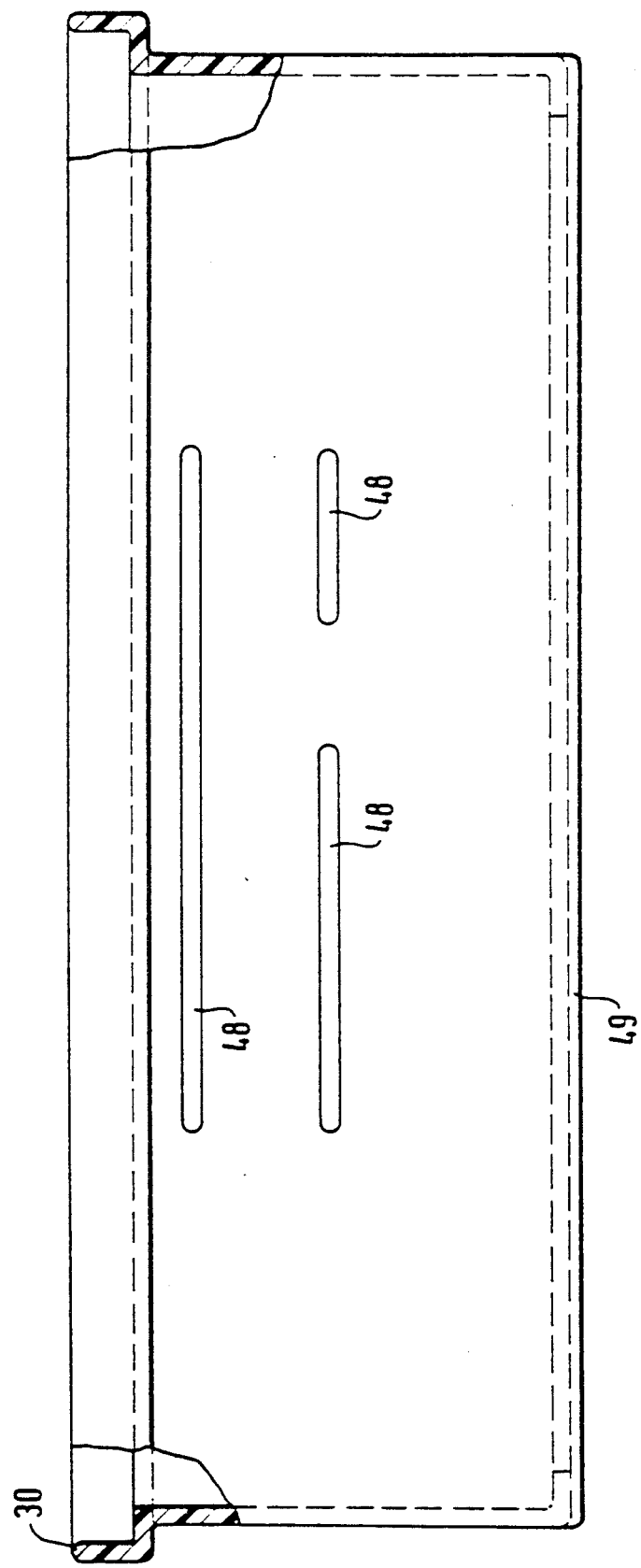
FIG. 3 is a side view of a frame for the filter insert.

In accordance with FIG. 3, which shows the frame 30 in a side elevation, the lateral surfaces of the frame may be provided with bolster-shaped ridges 48 instead of the wedge-shaped arrangement of the lateral surfaces. Similar ridges 49 can also be formed in like manner on the bottom of frame 30.

The arrangement of these elements avoids large-area contact surfaces between the frame 30 and the cover 50. This configuration thus also reduces the releasing forces necessary for the replacement of the filter insert.

Alternatively, at least one of the sliding surfaces may be provided with raised points for preventing full surface contact between the sliding surfaces.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. An air intake filter for an internal combustion engine, said filter comprising
   a housing having a filter insertion opening at one side thereof;
   a flat, replaceable filter insert through which air passes transversely in operation, said filter insert being insertable into said filter housing through said filter insertion opening and having a gasket disposed circumferentially on an end face for sealingly engaging a ledge of the filter housing, said housing having inclined shoulders on lateral parts thereof for pressing said filter insert with said gasket against said ledge;
   a frame having a substantially open end face for replaceably receiving said filter insert, and
   a cover which can be pushed in the direction of insertion of said filter insert from an extended position to a lockable closed position, said cover having wedge-shaped abutments resting against said inclined ledges of said lateral parts of said filter housing and against the bottom of said frame for sealingly pressing said filter insert with said gasket against said ledge, and said cover further having two sliding wedges, which laterally embrace said frame and are fixedly joined to one another by a face plate, and catch means provided on said sliding wedges for engaging said frame and holding said frame in an extended position with respect to said cover.

2. An air intake filter according to claim 1, wherein said catch means comprises cams (40, 41) provided on the sliding wedges extending toward said frame (30), and said frame (30) snaps into the cams at frame corners (42, 43) adjacent said face plate (52).

3. An air intake filter according to claim 1, wherein said frame (30) and said cover (50) have surfaces which slide on one another and at least one of said sliding surfaces is provided with linear ridges (48, 49) extending in the sliding direction.

4. An air intake filter according to claim 1, wherein said frame (30) and said cover (50) have surfaces which slide on one another and at least one of said sliding surfaces is provided with raised points for preventing full surface contact.

5. An air intake filter according to claim 1, wherein lateral surfaces of said frame (30) adjacent said sliding wedges (51) also have a wedge-like configuration, such that, when said cover (50) is unlocked and moved to said extended position, the distance between the lateral surfaces of the frame (30) and the sliding wedges increases.

6. An air intake filter according to claim 1, wherein lateral parts (25, 26) of said filter housing (11) adjacent said sliding wedges also have a wedge-shaped configuration, such that, when the cover (50) is unlocked and moved toward said extended position, the distance between said lateral housing parts (25, 26) and the sliding wedges increases.

7. An air intake filter according to claim 1, wherein said gasket (22) on the filter insert has an average Shore hardness of 8-16.

* * * * *